(12) United States Patent
Chagnot et al.

(10) Patent No.: US 9,399,270 B2
(45) Date of Patent: Jul. 26, 2016

(54) LASER CUTTING METHOD OPTIMIZED IN TERMS OF MASS DEFECT PER UNIT LENGTH

(75) Inventors: Christophe Chagnot, Velizy-Villacoublay (FR); Gaëtan Canneau, Paris (FR); Guy Pilot, Magne les Hameaux (FR); Sylvain Fauvel, Bures-sur Yvette (FR)

(73) Assignees: COMMISSARIAT A L'ENERGIE ATOMIQUE ET AUX ENERGIES ALTERNATIVES (FR); Institut de Radioprotection et de Sûreté Nucléaire (FR)

( * ) Notice: Subject to any disclaimer, the term of this patent is extended or adjusted under 35 U.S.C. 154(b) by 632 days.

(21) Appl. No.: 13/882,571
(22) PCT Filed: Oct. 28, 2011
(86) PCT No.: PCT/EP2011/068970
§ 371 (c)(1),
(2), (4) Date: Sep. 12, 2013
(87) PCT Pub. No.: WO2012/059421
PCT Pub. Date: May 10, 2012

(65) Prior Publication Data
US 2013/0299473 A1    Nov. 14, 2013

(30) Foreign Application Priority Data
Nov. 2, 2010 (FR) ..................................... 10 58989

(51) Int. Cl.
*B23K 26/36* (2014.01)
*B23K 26/38* (2014.01)
(Continued)

(52) U.S. Cl.
CPC .............. *B23K 26/38* (2013.01); *B23K 26/0626* (2013.01); *B23K 26/14* (2013.01); *G21D 1/003* (2013.01)

(58) Field of Classification Search
CPC ......... B23K 26/08; B23K 26/36; B23K 26/38
USPC .............. 219/121.62, 121.67, 121.72; 372/31
See application file for complete search history.

(56) References Cited

U.S. PATENT DOCUMENTS

2001/0050091 A1 * 12/2001 Yao ....................... B08B 7/0042
134/1.3

FOREIGN PATENT DOCUMENTS

JP      07236985 A * 9/1995
JP      2006007304 A   1/2006

OTHER PUBLICATIONS

Bohme et al., "Handbuch der Schweissverfahren, Teil2", Handbuch Der Schweissverfahren, XX, XX, Jan. 1, 1992, pp. 174-175.
(Continued)

*Primary Examiner* — Samuel M Heinrich
(74) *Attorney, Agent, or Firm* — Lerner, David, Littenberg, Krumholz & Mentlik, LLP

(57) ABSTRACT

The invention relates to an optimized laser cutting method for cutting a part from a material by means of a cutting system comprising: a laser source for producing a laser beam having a certain power; and a cutting head comprising an end nozzle for passage of a cutting laser beam, said method being characterized in that it comprises a step of determining the cutting power Pd such that: Pd=Max(Popt;λe) where Max is the mathematical operator of the maximum, Popt is an optimal power of the laser beam of the cutting system, which is predetermined in accordance with the part to be cut, and/or with cutting parameters and/or with system parameters, to minimize the mass defect per unit length of the part when the part is being cut, λ is a leading coefficient representing the number of kW required for cutting the part per mm of the thickness of the part, and e is the thickness of the part in mm.

4 Claims, 3 Drawing Sheets

(51) Int. Cl.
 *B23K 26/06* (2014.01)
 *B23K 26/14* (2014.01)
 *G21D 1/00* (2006.01)

(56) References Cited

OTHER PUBLICATIONS

Drygalla M et al., "Modularised laser beam cutting technology for dismantling applications", Welding in the World, Elsevier/International Institute of Welding, Rossy, FR, vol. 51, No. 9/10, Sep. 1, 2007, pp. 17-23.

French Preliminary Search Report for Application No. FR1058989 dated Jun. 27, 2011.

International Search Report for Application No. PCT/EP2011/068970 dated Jan. 19, 2012.

Pavele L A, "Effects of the Energy and Gas-Hydrodynamic Parameters of the Laser Cutting Process on the Formation of Cut Surfaces", Welding International, Taylor & Francis, Abingdon, GB, vol. 20, No. 4, Jan. 1, 2006, pp. 316-321.

Ricerche A, "Laser Beam Cutting and Sealing of Piping from High-Risk Plants", Welding International, Taylor & Francis, Abingdon, GB, vol. 9, No. 8, Jan. 1, 1995, pp. 629-633.

* cited by examiner

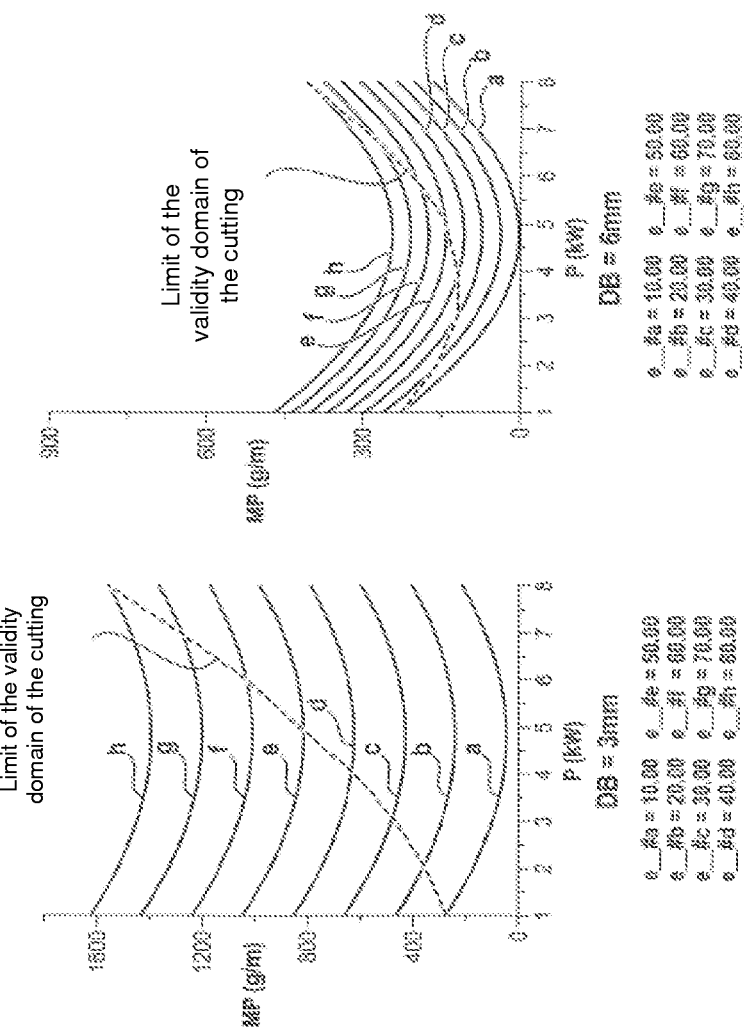

LASER CUTTING METHOD OPTIMIZED IN TERMS OF MASS DEFECT PER UNIT LENGTH

GENERAL TECHNICAL FIELD

The present invention relates to an optimized laser cutting method for cutting a part from a material by means of a cutting system comprising
a laser source for producing a laser beam having a certain power, and
a cutting head comprising an end nozzle for the passage of the cutting laser beam.

PRIOR ART

An application of lasers for cutting materials, particularly metals, is known. The cutting is created by evaporation and melting of the material subjected to the laser beam.

A laser cutting system comprises in a conventional manner a head, comprising an internal chamber and an inlet of gas under pressure and filling the chamber before being ejected towards the material to be cut.

The gas makes it possible to evacuate the material that was melted and vaporized by the laser beam.

The molten material, which is in part oxidized, re-solidifies outside of the cutting. The following may be distinguished:
slag adhering to the surface of the cut-out material, in other words solid particles constituted by ejection of the molten material from the cutting groove and compounds thereof formed by oxidoreduction as well as accumulation of impurities during the melting of the cut-out material;
sedimented slag, in other words slag not adhering to the surface of the cut-out material and falling by gravity;
aerosols, in other words solid particles formed by the projection and the vaporization of a part of the material from the cutting and the constitution of compounds formed by oxidoreduction during the melting of the cut material, but remaining in suspension in a surrounding gaseous environment, in other words having a negligible fall velocity.

Adherent slag, being linked to the cut material, is collected together with the cut-out material.

On the other hand, dispersion of sedimented slag makes the collection thereof difficult.

It will be easily understood that when laser cutting is used for dismantling nuclear facilities, sedimented slag is even more undesirable, because it contains irradiated or contaminated materials, which are consequently radioactive.

No optimized laser cutting method exists at the present time that makes it possible to limit the production of residues, particularly of sedimented slag.

DESCRIPTION OF THE INVENTION

The invention proposes overcoming at least one of these drawbacks.

To this end, according to the invention an optimized laser cutting method for cutting out a piece from a material by a cutting system is proposed and comprises
a laser source for producing a laser beam having a power, and
a cutting head comprising an end nozzle for the passage of the cutting laser beam,
wherein the method is characterized in that it comprises a step of determining a cutting power Pd such that:

$$Pd = \text{Max}(P_{opt}; \lambda e)$$

where Max is the mathematical operator of the maximum,
Popt is an optimal power of the laser beam of the cutting system, determined in accordance
with the piece to be cut out, and/or
with cutting parameters and/or
with the type of system,
in order to minimize the mass defect per unit length of the piece during cutting of said piece,
$\lambda$ is a leading coefficient representing the number of kW required for cutting out the piece per mm of piece thickness, and
e is the thickness of the piece, in mm.

The invention is advantageously completed by the following characteristics, taken alone or in any technically possible combination thereof:
the cutting power Pd is of the form:

$$Pd = \text{Max}(\Lambda; \lambda e)$$

where $\Lambda$ is a predetermined constant,
$\lambda$ is a leading coefficient representing the number of kW required for cutting the piece per mm of piece thickness, and
e is the thickness of the piece, in mm.
for a cutting system comprising a laser source of the yttrium aluminium garnet YAG type for the production of a laser beam having a wavelength of the order of 1 µm, the power Pd is of the form:

$$Pd = \text{Max}(4.75; 0.1 \cdot e)$$

the method comprises an initial step of determining an expression of the laser beam power in accordance with the piece to be cut-out, and/or with cutting parameters, and/or with the type of system, wherein according to this initial step:
the system performs a plurality of test cuttings of a piece while varying the power of the beam, and/or the piece to be cut-out, and/or the cutting parameters and/or the type of system;
a sensor performs a plurality of corresponding measurements of the mass defect during each test cutting of the piece,
a computer
expresses the mass defect per unit length during each test cutting of the piece in accordance with the power of the beam, and/or with the piece to be cut-out, and/or with cutting parameters and/or with the type of system;
performs a partial derivative of the expression of the mass defect per unit length, with respect to the power of the laser beam, and determines (S4) the expression making it possible to cancel out said partial derivative in accordance with the piece to be cut-out, and/or with cutting parameters and/or with the type of system.

The invention has numerous advantages.
It makes it possible indeed to favour formation of adherent slag, instead of sedimented slag, to facilitate the evacuation of the cutting residues with the cut-out material.

The dispersion of the sedimented slag in the surrounding environment is reduced.

Indeed, the mass defect per unit length Mp is defined as the mass defect of the piece, after the cutting, per unit of cut-out length, expressed in g/m. Mp is obtained by weight difference before Mi and after Mf the cutting of length L:

$$M_P = \frac{M_f - M_i}{L}.$$

Mp takes into account both the loss of material by transformation of the metal into sedimented slag and into aerosols, but also a gain in weight by oxidation of the adherent slag.

It will be understood however that by minimising the mass defect per unit length, the proportion of adherent slag is increased compared to sedimented slag.

The reduction particularly of sedimented slag is advantageous in the case where laser cutting is used for dismantling nuclear facilities. The collection of wastes is thereby facilitated.

On the other hand, the cutting is always carried out.

DESCRIPTION OF DRAWINGS

Other characteristics, aims and advantages of the invention will become apparent from the description that follows, which is exclusively illustrative and non-limiting, and which should be read with reference to the appended drawings, among which:

FIG. 3 illustrate the effect of the piece thickness on the mass defect per unit length as a function of the power of the laser beam, for nozzle diameters DB of 3 mm and 6 mm (H=30 mm).

In all of the figures, similar components bear identical reference signs.

DETAILED DESCRIPTION

Figure 1:
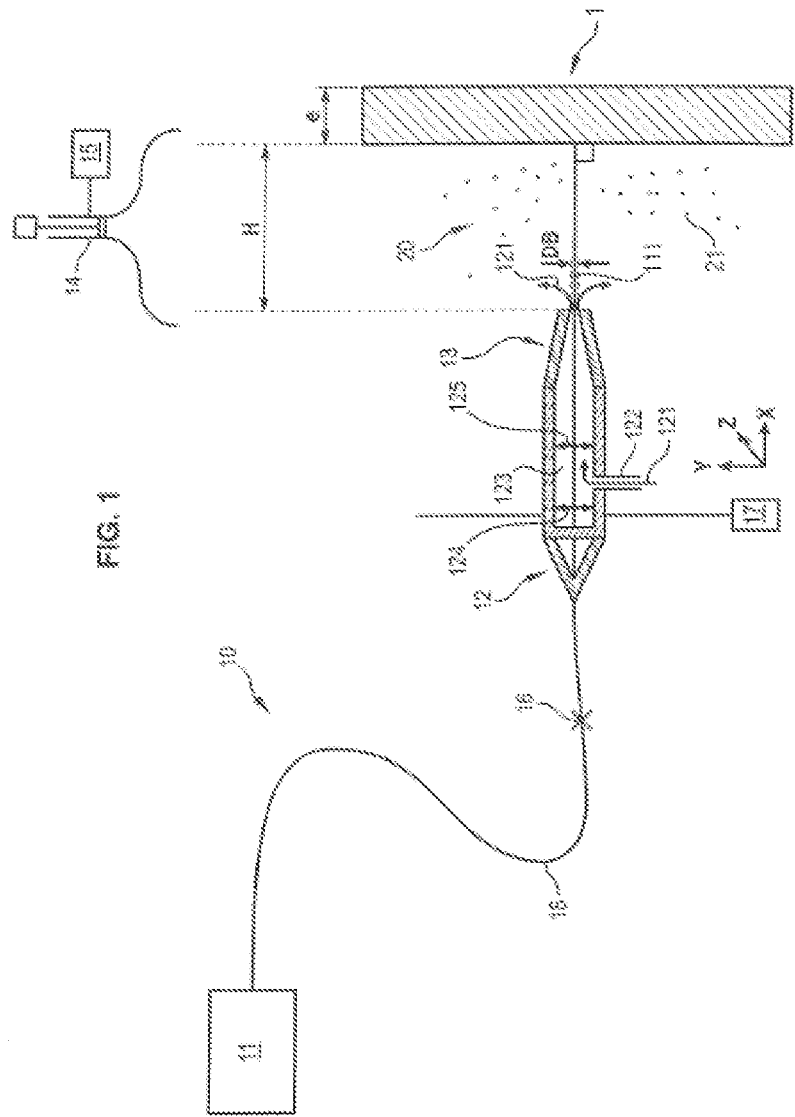
FIG. 1, already explained, illustrates a cutting system.

FIG. 1 illustrates a cutting system 10 mainly comprising a laser source 11 for producing a laser beam 111 having a power, for cutting out a piece 1 of a certain thickness e, and a cutting head 12 comprising an end nozzle 13 for the passage of the cutting laser beam 111.

The piece 1 is represented flat, but can also have any profile, for example curved.

The beam 111 must typically have a power of 1 kW per cm (10 mm) of thickness of piece to be cut out, particularly for stainless steel.

The diameter of the nozzle 13 is referenced DB. It is in general 3 mm or 6 mm, but other values are obviously possible.

The source 11 is connected to the head by two optic fibres. The first one, situated outside the worksite or the dismantling cell, is not contaminable, unlike the second one, situated inside the worksite. Both fibres are connected by means of an optical coupler 16. Each fibre is provided at each of the ends thereof with a connector that enables its dismantling: from the source, from the coupler and from the optic head. The replacement of the head 12 and the second fibre is thereby facilitated, notably when the head 12 or the fibre has been used for dismantling nuclear facilities, and is thus likely to be radioactive by contamination.

The fibre 18 may be of any length, but is in general of a length of 100 m from the source 11 up to the coupler 16 (for a diameter of 400 µm for example), and of 20 m from the coupler to the head 12 (for a diameter of 600 µm for example).

The cutting position of the beam 111 is preferentially at right angles with respect to the piece 1 to be cut out, for example horizontally. The distance H between the end of the nozzle 13 and the piece 1 may be of different values, but is in general comprised between 5 and 30 mm, as a function of the power of the beam 111 and of a piece thickness e.

The head 12 may be moved along five axes (three translations and two rotations) to carry out the cutting, by means of an actuator 17 (typically a five axis robot or a remote manipulator).

The movement of the head 12 takes place at a certain standard cutting speed V, during a cutting. It will be understood that a certain time is necessary to cut a thickness e of a piece 1, for a given power of the beam 111: if the head 12 moves too quickly with respect to the piece 1, the cutting is not performed correctly throughout the whole thickness e. The limit cutting speed $V_L$ designates the speed above which the piece 1 cannot be cut out.

The limit speed $V_L$ is never, in practice, reached on a dismantling site, to ensure a safety margin and to guarantee the cutting of the piece.

A coefficient k is thus defined, called limit speed coefficient of the cutting head 12, as the ratio between the standard cutting speed and the limit cutting speed of the part 1, i.e.:

$$k = \frac{V}{V_L}.$$

k takes in general the values of 0.5 or 0.7 on work sites, but can have any value below 1 according to the desired safety margin.

In a conventional manner, the head 12 comprises an internal chamber 123 and an inlet 122, which is generally lateral, for pressurised gas 121 and for filling the chamber 123. The nozzle 123 also lets the pressurised gas 121 that surrounds the beam 111 escape. The gas 121 makes it possible to evacuate the material from the piece 1 that is melted and vaporised by the beam 111. The gas 121 is in general air. A gas passage flow rate is of the order of 400 L/min.

The chamber 123 comprises a collimating lens 124 for the beam 111 and a focusing lens 125 for the beam 111. The focal length of the collimating lens 124 may be 80 mm for example, and the focal length of the focusing lens 125 may be 253 mm for example.

During the cutting of the piece 1 by the beam 111, residues are created, particularly aerosols 20 and sedimented slag 21, which creates a mass defect Mp per unit length.

General Principle of the Invention

The invention makes it possible to minimise the Mp defect during a cutting of the piece 1, by determining an optimal power Popt of the laser beam 111 of the cutting system 10.

To this end, the optimal power Popt of the laser beam 111 of the cutting system 10 is expressed, in an expression, in accordance with the piece 1 to be cut out, and/or with cutting parameters, and/or with the type of system 10, in order to minimize the mass defect per unit length during a cutting of the piece 1.

The minimisation of the mass defect per unit length will mainly maximise the production of adherent slag.

The piece 1 is for example represented in the aforementioned expression by the value e of the piece thickness, but could for example also be represented by another parameter representative of the piece, such as the type of material and/or alloy making up the piece (304 or 316 L for example).

The cutting parameters in the aforementioned expression are for example the distance H between the nozzle 13 and the piece 1, or the coefficient k, or also for example the impact diameter of the beam.

The type of system is for example represented in the aforementioned expression by the diameter DB, linked to the flow rate of gas 121, but other parameters could also be taken into account, such as
- the flow rate of gas,
- the nature of the gas,
- the cut-off pressure at the surface of the piece 1, or
- the type of optic fibre.

The cut-off pressure is linked to the kinetic energy of the gas 121 and results from the flow rate of gas 121, the diameter DB and the geometry of the nozzle 13, as well as the distance H.

A minimal cut-off pressure is required to ensure the cutting. Thus, for an impact diameter of the laser beam on the piece comprised between 2 and 4 mm, a pressure of 0.08 bars is required to cut out 10 mm of stainless steel. In practice, 0.25 bars is a value that ensures a satisfactory robustness for piece thicknesses below 80 mm. A pressure of 0.8 bars enables stainless steel pieces up to 100 mm to be cut-out.

A higher cut-off pressure admittedly improves the productivity of the cutting, by providing a higher limit speed for the same power (a pressure of 0.8 bars thus makes it possible to double the limit cutting speed obtained with the impact pressure of 0.25 bars for thicknesses comprised between 20 and 80 mm), but it reduces the proportion of adherent slag to the profit of sedimented slag by favouring the evacuation of the molten material and slag that form inside the cutting edge.

The value of 0.25 is thus recommended for thicknesses below 80 mm and the value of 0.8 bar is recommended for thicknesses from 80 to 100 mm or from 20 to 80 mm if enhanced productivity is required.

General Principle of Determining the Power

In order to be able to determine the power Popt, it will be understood that it is necessary to go through an initial step of determining the expression of the power in accordance with the piece 1 to be cut out, and/or with cutting parameters, and/or with the type of system 10.

Figure 2:
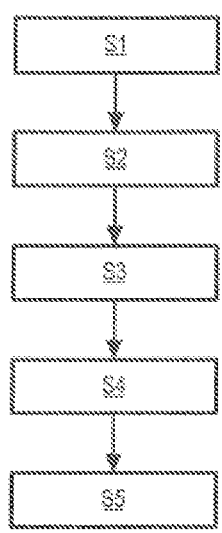
FIG. 2 illustrates the main sub-steps of a method according to the invention.

According to the initial step of determination represented in a schematic manner in FIG. 2, the system 10 carries out, during a step S1, a plurality of test cuttings of a piece 1 while varying the power of the beam 111, and/or the piece 1 to be cut out, and/or the cutting parameters and/or the type of system 10.

During step S1, the system 10 thus performs cuttings with for example:
- different power values of the beam 111, and/or
- different values of thicknesses e of piece 1, and/or
- different values of k, and/or
- different values of H, and/or
- different values of DB.

During a step S2, a sensor 14 performs a plurality of corresponding measurements of the Mp defect during each test cutting of the piece 1.

The sensor 14 used during step S2 comprises in particular a balance making it possible to weigh the piece 1 before and after the cutting.

A computer 15 known to those skilled in the art, comprising all conventional memory and processing means, and connected to the sensor 14, makes it possible to plot the curves of FIG. 3 representing in a general manner the evolution of Mp as a function of the power of the beam 111.

The inventors have noted that the curves of FIG. 3 seem to indicate that the mass defect per unit length is minimal for a certain power, called Popt in the present description.

Steps S3 and S4 thus make it possible to determine Popt as a function of the measurements of the sensor 14.

To this end, during step S3, the computer 15 expresses Mp during each test cutting of the part 1 in accordance with the power of the beam 111, and/or with the piece 1 to be cut, and/or with cutting parameters and/or with the type of system 10.

If the parameters taken into account are the power P, the thickness e, the coefficient k, the distance H and the nozzle diameter DB, an expression of the following type is obtained by means of the computer 15:

$$M_P = f(P, e, k, H, DB) \tag{E1}$$

To find the expression E1, the computer 15 thus performs the construction of a mathematical model as a function of the measurements stemming from the sensor 14, using a plurality of regressions, for example linear, logarithmic, square, or other, and keeps the expression giving the model closest to the measurements, in other words the model gives a known mathematical correlation coefficient $R^2$, between the measures and the values given by the model, such as for example:

$$R^2 > 0.9.$$

Since the curves of FIG. 3 show that Mp as a function of the power comprises a minimum, the computer 15 finds this minimum by cancelling out, during step S4, a partial derivative of the expression (E1) of Mp with respect to the power of the laser beam. It is then known that the cancellation of the partial derivative corresponds to the optimum of P.

The computer 15 thus firstly performs:

$$\frac{\partial M_P}{\partial P} = \frac{\partial}{\partial P} f(P, e, k, H, DB) \tag{E2}$$

The computer 15 then also determines during step S4 the expression making it possible to cancel out said partial derivative in accordance with the piece 1 to be cut, and/or with cutting parameters and/or with the type of system 10. The computer 15 thus performs:

$$\frac{\partial M_P}{\partial P} = 0$$

to find the expression of P minimizing the mass defect per unit length.

Example of Determination

During step S1, the system 10 performs a plurality of test cuttings of a piece 1 of thickness e, with a diameter DB of the nozzle 13 and a limit speed coefficient k of the cutting head 12.

The system 10 used comprises a laser source 11 of the yttrium aluminium garnet YAG type, for example with disc, capable of producing a laser beam 111 having a wavelength of the order of 1 µm.

During cuttings, the power P of the laser beam 111 is variable from 1 to 8 kW (powers of 3 kW, 5 kW and 8 kW are for example used), taking account of the fact that it is necessary, to have around 1 kW for each cm (10 mm) of thickness of the piece for the cutting to be effective.

The flow rate of gas 121 has been maintained constant and equal to 400 L/min during the plurality of cuttings.

The piece 1 to be cut out is a piece made of 316 L stainless steel (reference AFNOR standard: X2 Cr Ni Mo 18-10 1.4404) with thickness e, representative of the constituent components of a nuclear facility to dismantle. During test cuttings, the thickness e varies for example from 10 mm to 80 mm.

During test cuttings, the diameters DB take the values 3 mm or 6 mm.

The values 0.1; 0.25; 0.5 and 0.7 are taken for k. By way of information, the values of $V_L$ are reproduced in the following tables 1 and 2, for a 316L stainless steel piece—H 30 mm—Flow rate 400 L/min: limit speed (mm/min).

TABLE 1 limit cutting speeds for the nozzle of DB 3 mm.

| e (mm) | VL 8 KW | VL 6 KW | VL 4 KW | VL 3 KW | VL 2 KW |
|---|---|---|---|---|---|
| 100 | 7.5 | | | | |
| 80 | 20 | | | | |
| 60 | 40 | 20 | | | |
| 40 | 125 | 75 | 20 | | |
| 30 | 200 | 125 | 75 | 40 | |
| 20 | 450 | 300 | 175 | 100 | 20 |
| 10 | 1200 | 900 | 600 | 400 | 200 |

TABLE 2 limit cutting speeds for the nozzle of DB 6 mm.

| e (mm) | VL 8 KW | VL 6 KW | VL 4 KW | VL 3 KW | VL 2 KW |
|---|---|---|---|---|---|
| 100 | | | | | |
| 80 | 10 | | | | |
| 60 | 30 | 15 | | | |
| 40 | 75 | 60 | 10 | | |
| 30 | 175 | 125 | 50 | 20 | |
| 20 | 350 | 250 | 125 | 70 | 10 |
| 10 | 1000 | 800 | 600 | 400 | 200 |

Table 3 hereafter reproduces the measures of the sensor 14 concerning the mass defect per unit length of the piece 1 (final column).

During step S2, the computer 15 constructs the curves of FIG. 3, according to the measurements of table 3 stemming from the sensor 14 for the cuttings of step S1.

In FIG. 3, the black curve represents the upper limit of the validity domain of the curves, to take account of the constraint of 1 kW of power per cm (10 mm) of thickness of piece to be cut.

During step S3, the computer 15 expresses the mass defect during each test cutting of the piece 1 as a function of the power P of the beam 111, the thickness e of the piece 1 to be cut out, the distance H, the coefficient k and the nozzle diameter DB of the system 10.

The computer 15 uses a linear regression from the measures of step S2 to give the best model. In our example, the equation (E1) is for example expressed in the following manner, from the measurements of table 3:

$$M_P = 237 - 93.2 \cdot (DB - 4.40) + 46.6 \cdot (P - 6.20) + 11.9 \cdot (e - 24.7) - 5.26 \cdot (DB - 4.40) \cdot (e - 24.7) + 16.0 \cdot (P - 6.20)^2 \quad (E1)$$

The correlation coefficient of (E1) with respect to the measures of table 3 is $$R^2 = 0.9724.$$

The equation (E2) corresponding to the partial derivative of the expression of (E1) is thus

TABLE 3

| N° plan | Nozzle diameter DB mm | Laser power P kW | Plate thickness e mm | Distance plaque- H mm | Cutting speed k — | Cutting speed VR m/min | Masse per unit length of IC M, g/m | Masse per unit length of IC (M,) g/m | Surface mass of aerosol IC $m_2$ g/m² | Surface mass of aerosol IC $(M_2)$ g/m² | Mass per unit length $H_2$ IC $[H_2]$ mg/m | Mass per unit length $H_2$ IC $([H_2])$ mg/m | Volume adherent slag V cm³/m | Mass defect of the plate IC $M_p$ g/m | Mass defect of the plate IC (Mp) g/m |
|---|---|---|---|---|---|---|---|---|---|---|---|---|---|---|---|
| 0 | 3 | 2.1 | 10 | 30 | 0.50 | 0.109 | 2.26 | 0.22 | | | 9.0 | 1.9 | 16.7 | 110 | 2 |
| 1 | 3 | 3 | 10 | 30 | 0.25 | 0.109 | 3.55 | 0.25 | 359 | 25 | 11.7 | 3.1 | 16.9 | 153 | 4 |
| 2 | 6 | 3 | 10 | 15 | 0.48 | 0.179 | 1.27 | 0.09 | 128 | 9 | 4.6 | 1.9 | 35.1 | 64 | 4 |
| 3 | 3 | 8 | 10 | 15 | 0.50 | 0.477 | 4.10 | 0.28 | 415 | 29 | 13.6 | 2.4 | 2.3 | 179 | 4 |
| 4 | 6 | 8 | 10 | 30 | 0.25 | 0.249 | 2.23 | 0.16 | 226 | 16 | 7.9 | 2.3 | 16.5 | 169 | 4 |
| 4 | 6 | 8 | 10 | 30 | 0.25 | 0.249 | 2.25 | 0.16 | 228 | 16 | 7.5 | 2.2 | 24.8 | 193 | 4 |
| 4 | 6 | 8 | 10 | 30 | 0.25 | 0.249 | 2.39 | 0.17 | 242 | 17 | 4.5 | 2.0 | 26.2 | 185 | 4 |
| 4 | 6 | 8 | 10 | 30 | 0.25 | 0.249 | 2.34 | 0.16 | 237 | 17 | 4.7 | 2.0 | | 171 | 4 |
| 5 | 3 | 3 | 20 | 30 | 0.49 | 0.044 | 12.5 | 0.9 | 611 | 42 | 31.6 | 6.0 | 17.5 | 292 | 7 |
| 5 | 3 | 3 | 20 | 30 | 0.49 | 0.044 | 10.9 | 0.8 | 534 | 37 | 24.2 | 6.7 | 37.2 | 275 | 10 |
| 6 | 6 | 3 | 20 | 15 | 0.25 | 0.015 | 12.2 | 0.9 | 595 | 43 | 5.2 | 6.2 | 91.9 | 106 | 20 |
| 7 | 3 | 8 | 20 | 15 | 0.24 | 0.109 | 8.84 | 0.88 | 432 | 43 | 19.8 | 5.8 | 20.9 | 393 | 10 |
| 8 | 6 | 8 | 20 | 30 | 0.50 | 0.199 | 2.90 | 0.20 | 141 | 10 | 6.2 | 2.9 | 126.0 | 276 | 6 |
| 8 | 6 | 8 | 20 | 30 | 0.50 | 0.199 | 3.41 | 0.24 | 167 | 12 | 5.0 | 2.9 | 148.5 | 247 | 6 |
| 9 | 3 | 8 | 30 | 30 | 0.25 | 0.056 | 15.7 | 1.1 | 504 | 37 | 13.7 | 8.3 | 58.0 | 586 | 22 |
| 10 | 3 | 8 | 60 | 30 | 0.24 | 0.010 | 32.4 | 3.3 | 533 | 55 | 27.9 | 19.3 | | 1336 | 42 |
| 11 | 3 | 8 | 30 | 30 | 0.49 | 0.109 | 10.6 | 0.7 | 340 | 24 | 20.9 | 6.1 | 15.3 | 692 | 11 |
| 11 | 3 | 8 | 30 | 30 | 0.49 | 0.109 | 10.0 | 0.7 | 322 | 23 | 20.0 | 5.5 | 22.1 | 662 | 10 |
| 12 | 3 | 8 | 60 | 30 | 0.50 | 0.021 | 33.8 | 2.4 | 556 | 40 | 67.3 | 14.9 | 135.3 | 925 | 22 |
| 13 | 3 | 8 | 80 | 30 | 0.57 | 0.010 | 40.4 | 2.9 | 504 | 38 | 59.7 | 22.5 | | 1576 | 45 |
| 14 | 3 | 5 | 30 | 30 | 0.70 | 0.070 | 8.41 | 0.59 | 270 | 19 | 16.2 | 6.1 | 85.4 | 390 | 10 |
| 15 | 3 | 8 | 30 | 30 | 0.71 | 0.159 | 6.47 | 0.37 | 208 | 12 | 19.7 | 6.5 | 11.0 | 657 | 11 |
| 17 | 3 | 8 | 60 | 30 | 0.71 | 0.030 | 32.5 | 1.9 | 534 | 31 | 62.7 | 15.0 | 99.0 | 1162 | 24 |
| 18 | 6 | 8 | 20 | 30 | 0.09 | 0.035 | 9.64 | 0.69 | 471 | 34 | 4.0 | 5.8 | 104.5 | 79 | 19 |
| 19 | 6 | 8 | 10 | 30 | 0.50 | 0.497 | 1.38 | 0.10 | 140 | 10 | 2.9 | 1.8 | 48.7 | 105 | 4 |
| 20 | 6 | 3 | 10 | 30 | 0.50 | 0.189 | 0.55 | 0.04 | 56 | 4 | 2.8 | 1.8 | 36.5 | 53 | 4 |
| 21 | 6 | 3 | 10 | 10 | 0.11 | 0.040 | 4.91 | 0.34 | 497 | 35 | 3.2 | 4.3 | 18.1 | 82 | 9 |
| 22 | 6 | 3 | 10 | 30 | 0.11 | 0.040 | 2.86 | 0.21 | 290 | 21 | 0.0 | | 43.3 | 53 | 10 |
| 23 | 3 | 8 | 60 | 15 | 0.24 | 0.010 | 43.7 | 3.2 | 719 | 55 | 27.6 | 19.0 | | 1259 | 43 |
| 25 | 6* | 3 | 10 | 0 | 0.11 | 0.040 | 4.75 | 0.33 | 481 | 34 | 4.5 | 4.9 | | 47 | 9 |

$$\frac{\partial}{\partial P} M_P = [46.6 + 32P - 198.4] = [32P - 151.8] \quad \text{(E2)}$$

The computer 15 then determines the expression making it possible to cancel out said partial derivative, in accordance with the piece 1 to be cut out, with cutting parameters and with the type of system 10.

By putting down:

$$\frac{\partial}{\partial P} M_P = 0$$

the computer 15 thus finds a constant Λ such that:

$$Popt = \frac{151.8}{32} = 4.75 \quad \text{(E3)}$$

Thus at step S5, the cutting power Pd is determined preferably such that it is equal to Popt, which minimises the mass defect per unit length during a cutting of the piece 1, while ensuring that the power is at least equal to the cutting power (it will be recalled that it is necessary to have around 1 kW for each cm of thickness of the piece for the cutting).

A minimal power Pmin=λ·e may thus be defined, with λ representing the number of kW required for cutting the piece per mm of thickness of the piece 1 (in our example 0.1), and e the thickness of the piece, in mm.

If Popt is such that

Popt<Pmin then Pmin will be taken for Pd.

On the other hand, if Popt is such that

Popt>Pmin then Popt will be taken for Pd.

The invention claimed is:

1. An optimized laser cutting method for cutting out a piece from a material by a cutting system comprising
    a laser source for producing a laser beam having a power, and
    a cutting head comprising an end nozzle for the passage of the cutting laser beam,
wherein the method is characterized in that it comprises a step of determining a cutting power Pd such that:

Pd=Max(Popt;λe)

where Max is the mathematical operator of the maximum,
    Popt is an optimal power of the laser beam of the cutting system, determined in accordance
        with the piece to be cut out, and/or
        with cutting parameters and/or
        with the type of system,
    in order to minimize the mass defect per unit length of the piece during a cutting of the piece,
    λ is a leading coefficient representing the number of kW required for cutting out the piece per mm of thickness of the piece, and
    e is the thickness of the piece, in mm.

2. The method according to claim 1, wherein the cutting power Pd is of the form:

Pd=Max(Λ;λe)

where Λ is a predetermined constant,
    λ is a leading coefficient representing the number of kW required for cutting out the piece per mm of thickness of the piece, and
    e is the thickness of the piece, in mm.

3. The method according to claim 2, wherein, for a cutting system comprising a laser source of the yttrium aluminium garnet YAG type for the production of a laser beam having a wavelength of the order of 1 μm, the power Pd is of the form:

Pd=Max(4.75;0.1·e).

4. The method according to claim 1, comprising an initial step of determining an expression of the power of the laser beam in accordance with the piece to be cut out, and/or with cutting parameters, and/or with the type of system, initial step according to which:
    the system performs a plurality of test cuttings of a piece while varying the power of the beam, and/or the piece to be cut out, and/or the cutting parameters and/or the type of system;
    a sensor performs a plurality of corresponding measurements of the mass defect during each test cutting of the piece,
    a computer
        expresses the mass defect per unit length during each test cutting of the piece in accordance with the power of the beam, and/or with the piece to be cut out, and/or with cutting parameters and/or with the type of system;
        performs a partial derivative of the expression of the mass defect per unit length, with respect to the power of the laser beam, and determines the expression making it possible to cancel out said partial derivative in accordance with the piece to be cut out, and/or with cutting parameters and/or with the type of system.

* * * * *